United States Patent
Glasgow, Jr. et al.

(10) Patent No.: US 10,760,401 B2
(45) Date of Patent: Sep. 1, 2020

(54) DOWNHOLE SYSTEM FOR DETERMINING A RATE OF PENETRATION OF A DOWNHOLE TOOL AND RELATED METHODS

(71) Applicants: Baker Hughes, a GE company, LLC, Houston, TX (US); Baker Hughes Oilfields Operations, Inc., Houston, TX (US)

(72) Inventors: R. Keith Glasgow, Jr., Willis, TX (US); Eric C. Sullivan, Houston, TX (US); Navish Makkar, Celle (DE); Otto Fanini, Houston, TX (US); Priscila Farias Ronqui, Orlando, FL (US); Jason R. Habernal, Magnolia, TX (US); Richard Yao, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 120 days.

(21) Appl. No.: 16/146,220

(22) Filed: Sep. 28, 2018

(65) Prior Publication Data
US 2019/0100986 A1 Apr. 4, 2019

Related U.S. Application Data

(60) Provisional application No. 62/565,756, filed on Sep. 29, 2017.

(51) Int. Cl.
*E21B 47/01* (2012.01)
*E21B 47/09* (2012.01)
(Continued)

(52) U.S. Cl.
CPC ............. *E21B 45/00* (2013.01); *E21B 21/08* (2013.01); *G01S 13/75* (2013.01); *G01S 13/758* (2013.01); *G01S 13/767* (2013.01)

(58) Field of Classification Search
CPC ........ E21B 47/01; E21B 47/09; E21B 47/122; E21B 45/00
See application file for complete search history.

(56) References Cited

U.S. PATENT DOCUMENTS

| | | | |
|---|---|---|---|
| 5,122,990 A | 6/1992 | Deines et al. | |
| 5,467,320 A | 11/1995 | Maki, Jr. | |

(Continued)

FOREIGN PATENT DOCUMENTS

| | | |
|---|---|---|
| EP | 0621397 B1 | 3/1998 |
| EP | 0865612 B1 | 6/2002 |

(Continued)

OTHER PUBLICATIONS

Wheat, H.G., Monitoring Corrosion Behavior Using Acoustic Emission Techniques, NACE International Corrosion Conference and Expo, (2007), Paper No. 07291, 15 pages.

(Continued)

*Primary Examiner* — Cathleen R Hutchins
(74) *Attorney, Agent, or Firm* — TraskBritt

(57) ABSTRACT

A method of determining a rate of penetration of a downhole tool. The method comprises introducing a downhole tool including a drill bit configured to drill through a subterranean formation in a wellbore, the downhole tool comprising at least one reader configured to communicate with identification tags using electromagnetic radiation. The method includes advancing the wellbore with the drill bit and placing, with a component of a bottomhole assembly of the downhole tool, a first identification tag at a first location proximate the wellbore and at least a second identification (Continued)

tag at a second location proximate the wellbore and separated from the first location by a distance. An interrogation signal is transmitting from the at least one reader toward a wall of the wellbore and response signals from the identification tags are received by the at least one reader to determine proximity of the identification tags to the reader. A rate of penetration of the downhole tool is determined, using a processor and associated memory, based at least in part on a distance between identification tags and an amount of time between receiving response signals from a first identification tag and at least a second identification tag. Downhole systems for determining a rate of penetration and other methods are also disclosed.

16 Claims, 3 Drawing Sheets

(51) Int. Cl.
   *E21B 45/00* (2006.01)
   *G01S 13/75* (2006.01)
   *E21B 21/08* (2006.01)
   *G01S 13/76* (2006.01)

(56) References Cited

U.S. PATENT DOCUMENTS

| | | | |
|---|---|---|---|
| 6,405,136 B1 * | 6/2002 | Li | H03M 7/30 702/10 |
| 6,480,118 B1 | 11/2002 | Rao | |
| 6,769,497 B2 | 8/2004 | Dubinsky et al. | |
| 6,791,469 B1 | 9/2004 | Rao et al. | |
| 7,636,052 B2 | 12/2009 | Coates et al. | |
| 7,705,295 B2 | 4/2010 | Jeffryes | |
| 7,950,451 B2 | 5/2011 | Alberty | |
| 8,125,849 B2 | 2/2012 | Cabrara et al. | |
| 8,215,384 B2 | 7/2012 | Trinh et al. | |
| 8,376,065 B2 | 2/2013 | Teodorescu et al. | |
| 8,411,530 B2 | 4/2013 | Slocum et al. | |
| 9,074,467 B2 | 7/2015 | Yang et al. | |
| 2002/0195276 A1 | 12/2002 | Dubinsky et al. | |
| 2005/0194184 A1 | 9/2005 | Gleitman | |
| 2009/0120637 A1 * | 5/2009 | Kirkwood | E21B 47/122 166/254.2 |
| 2009/0207041 A1 | 8/2009 | Zaeper et al. | |
| 2010/0095757 A1 | 4/2010 | Hansen | |
| 2010/0118657 A1 * | 5/2010 | Trinh | E21B 47/011 367/82 |
| 2012/0133526 A1 | 5/2012 | Christiansen | |
| 2013/0008648 A1 | 1/2013 | Lovorn et al. | |
| 2013/0081880 A1 | 4/2013 | Schwefe et al. | |
| 2015/0152723 A1 | 6/2015 | Hay | |

FOREIGN PATENT DOCUMENTS

| | | |
|---|---|---|
| EP | 1662673 A1 | 5/2006 |
| EP | 1714004 B1 | 9/2009 |
| EP | 2417331 B1 | 5/2014 |
| GB | 2331366 A | 5/1999 |
| GB | 2448256 B | 11/2008 |
| WO | 2002/103158 A1 | 12/2002 |
| WO | 2009/105561 A2 | 8/2009 |
| WO | 2010/011402 A1 | 1/2010 |
| WO | 2010/054353 A2 | 5/2010 |
| WO | 2014/007824 A1 | 1/2014 |

OTHER PUBLICATIONS

Turuntaev et al., Laboratory Experiments on Relation Between Pore Pressure Change and Acoustic (Microseismic) Emission, Rock Mechanics in Civil and Environmental Engineering, (Jun. 15-18, 2010), pp. 99-102.
Tetley, Laurie, Electronic Navagation Systems (Third Edition), Chapter 3, Speed Measurement, (2012), pp. 45-87.
Teledyne RD Instruments, Water Resources Product Overview Guide, How and Where is an ADCP Used?, www.rdinstruments.com, (2008), 2 pages.
Takahashi et al., Underwater Acoustic Sensor with Fiber Bragg Grafting, Optical Review, vol. 4, No. 6, (1997), pp. 691-694.
Srinivasan et al., Effects of Acoustic Source and Filtering on Time-of-Flight Measurements, Applied Acoustics, vol. 70, (2009), pp. 1061-1072.
Sontek, Acoustic Doppler Profiler (ADP) Principles of Operation, www.sontek.com, (Nov. 12, 2000), pp. 1-28.
Simpson, Michael R., Discharge Measurements Using a Broad-Band Acoustic Dopper Current Profiler, United States Geological Survey OPen-File Report 01-1, (2001), 134 pages.
Rantz et al., Measurement and Computation of Streamflow: vol. 1. Measurement of Stage and Discharge, Geological Survey Water-Supply Paper 2175, USGS Science for Changing the World, (1982), pp. 211-226.
Perkins et al., Acoustic Doppler Current Profiler Surveys of Velocity Downstream of Albeni Falls Dam, US Army Corps of Engineers, (Sep. 2010), 31 pages.
Morlock, Scott E., Evaluation of Acoustic Doppler Current Profiler Measurements of River Discharge, U.S. Geological Survey, Water-Resources Investigations Report 95-4218, (1996), 41 pages.
Massa, Donald P., An Overview of Electroacoustic Transducers, Massa Products Corporation, https://www.massa.com/wp-content/uploads/DPM_Overview_of_Electroacoustic_Transducers.pdf, (2014), 19 pages.
Kim et al., Using the Acoustic Doppler Current Profiler (ADCP) to Estimate Suspended Sediment Concentration, Study on Acoustics for SSC Measurements, Technical Report CPSD #04-0, (Dec. 2004), 22 pages.
Kim et al., Estimation of Suspended Sediment Concentration in Estuarine Environments Using Acoustic Backscatter from an ADCP, Journal of Hydrology and Hydromechanics, vol. 61, vol. 3, (Sep. 2013), pp. 232-240.
Gotvald et al., USGS, Science for a Changing World, Acoustic Doppler Current Profiler Applications Used in Rivers and Estuaries by the U.S. Geological Survey, Face Sheet 2008-3096, (Feb. 2009), 4 pages.
Fa et al., A new Device for Measuring In-situ Stresses by Using Acoustic Emissions in Rocks, American Rock Mechanics Association, ARMA 10-160, 5th U.S.-Canada Rock Mechanics Symposium, Jun. 27-30, 2010, 7 pages.
International Search Report for International Application No. PCT/US2018/053554 dated Feb. 27, 2019, 5 pages.
International Written Opinion for International Application No. PCT/US2018/053554 dated Feb. 27, 2019, 11 pages.

* cited by examiner

DOWNHOLE SYSTEM FOR DETERMINING A RATE OF PENETRATION OF A DOWNHOLE TOOL AND RELATED METHODS

CROSS-REFERENCE TO RELATED APPLICATION

This application claims the benefit under 35 U.S.C. § 119(e) of U.S. Provisional Patent Application Ser. No. 62/565,756, filed Sep. 29, 2017, and titled "DOWNHOLE SYSTEM FOR DETERMINING A RATE OF PENETRATION OF A DRILL STRING AND RELATED METHODS," the disclosure of which is hereby incorporated herein in its entirety by this reference.

TECHNICAL FIELD

Embodiments of the disclosure relate generally to drilling systems for determining a velocity of a drill string component within a wellbore, and to related methods of operating a wellbore. More particularly, embodiments of the disclosure relate to drilling systems including one or more of identification tags and associated readers, static-pitot tubes, and a processor for determining a rate of penetration of a drill string during a subterranean drilling operation.

BACKGROUND

Wellbores are formed in subterranean formations for various purposes including, for example, extraction of oil and gas and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof crush, shear, and/or abrade away the formation material to form the wellbore. A diameter of the wellbore drilled by the drill bit may be defined by the cutting structures disposed at the largest outer diameter, characterized in the art as the "gage diameter," of the drill bit.

The drill bit is coupled, either directly or indirectly, to an end of what is referred to in the art as a "drill string," which comprises a series of elongated tubular segments of drill pipe connected end-to-end that extends into the wellbore from the surface above the formation and commonly terminates at heavier-weight tubular drill collar segments. Often various tools and components, including the drill bit, may be coupled together at the distal end of the drill string at the bottom of the wellbore being drilled. This assembly of tools and components is referred to in the art as a "bottomhole assembly" (BHA).

The drill bit may be rotated within the wellbore by rotating the drill string from the surface, or the drill bit may be rotated by coupling the drill bit to a downhole motor, which is coupled to the drill string between the drill string and the drill bit proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

During drilling of a wellbore, the rate of penetration (ROP) of the drilling operation is a parameter of significant interest. However, accurate measurement of ROP may be difficult to obtain using conventional means due to, among other issues, drill string flexing, elongation, and contraction as the drill bit proceeds through one or more subterranean formations exhibiting different rock characteristics. Such difficulty may be further exacerbated during directional and horizontal drilling, where large segments of the drill string may, at any one time, contact the wellbore wall and frictionally stick while the drill string rotates, followed by sudden release or "slip" when drill string torque overcomes frictional forces.

BRIEF SUMMARY

Embodiments disclosed herein include downhole acoustic systems for determining a rate of penetration of a drill string, as well as related methods. For example, in accordance with one embodiment, a method of determining rate of penetration of a drill string comprises introducing a drill string including a drill bit configured to drill through a subterranean formation in a wellbore, the drill string comprising at least one reader configured to communicate with identification tags using electromagnetic radiation, advancing the wellbore with the drill bit, placing, with a component of a bottomhole assembly of the drill string, a first identification tag at a first location proximate the wellbore and at least a second identification tag at a second location proximate the wellbore separated from the first location by a distance, transmitting an interrogation signal comprising electromagnetic radiation from the at least one reader toward a wall of the wellbore and receiving, with the at least one reader, a response signal from each of the first identification tag and the at least a second identification tag when the at least one reader is located proximate each respective first identification tag and the at least a second identification tag, and determining, using a processor and associated memory, a rate of penetration of the drill string with the processor based at least in part on the distance and an amount of time between receiving a response signal from the first identification tag and receiving a response signal from the at least a second identification tag.

In additional embodiments, a downhole system for determining a rate of penetration of a drill string comprises a drill string including a drill bit configured to drill through a subterranean formation, a first identification tag and at least a second identification tag disposed within a component of a bottomhole assembly of the drill string, at least one reader coupled to a member of the drill string and configured to identify a location of the first identification tag and the second identification tag relative to the at least one reader, and a controller comprising a memory and a processor coupled to the at least one reader. The processor is configured to determine a duration between when the at least one reader receives, from each of the first identification tag and the at least a second identification tag, a unique signal comprising identification information associated with each of the respective first identification tag and the at least a second identification tag when the at least one reader is located proximate each of the respective first identification tag and the at least a second identification tag, and determine a rate of penetration of the drill string based on the duration and a distance between the first identification tag and the at least a second identification tag.

In yet additional embodiments, a method of determining a rate of penetration of a drill bit comprises introducing a drill string including a drill bit configured to drill through a subterranean formation in a wellbore, the drill string comprising a static-pitot tube coupled to an inner wall thereof and another static-pitot tube coupled to an outer wall thereof, determining a dynamic pressure of fluid within the drill string and a dynamic pressure of fluid within an annular space between the outer wall of the drill string and a wall of the wellbore, and determining, using a processor and associated memory, a rate of penetration of the drill string with the processor based at least in part on the dynamic pressure of the fluid within the drill string and the dynamic pressure of the fluid within the annular space.

DETAILED DESCRIPTION

Figure 1:
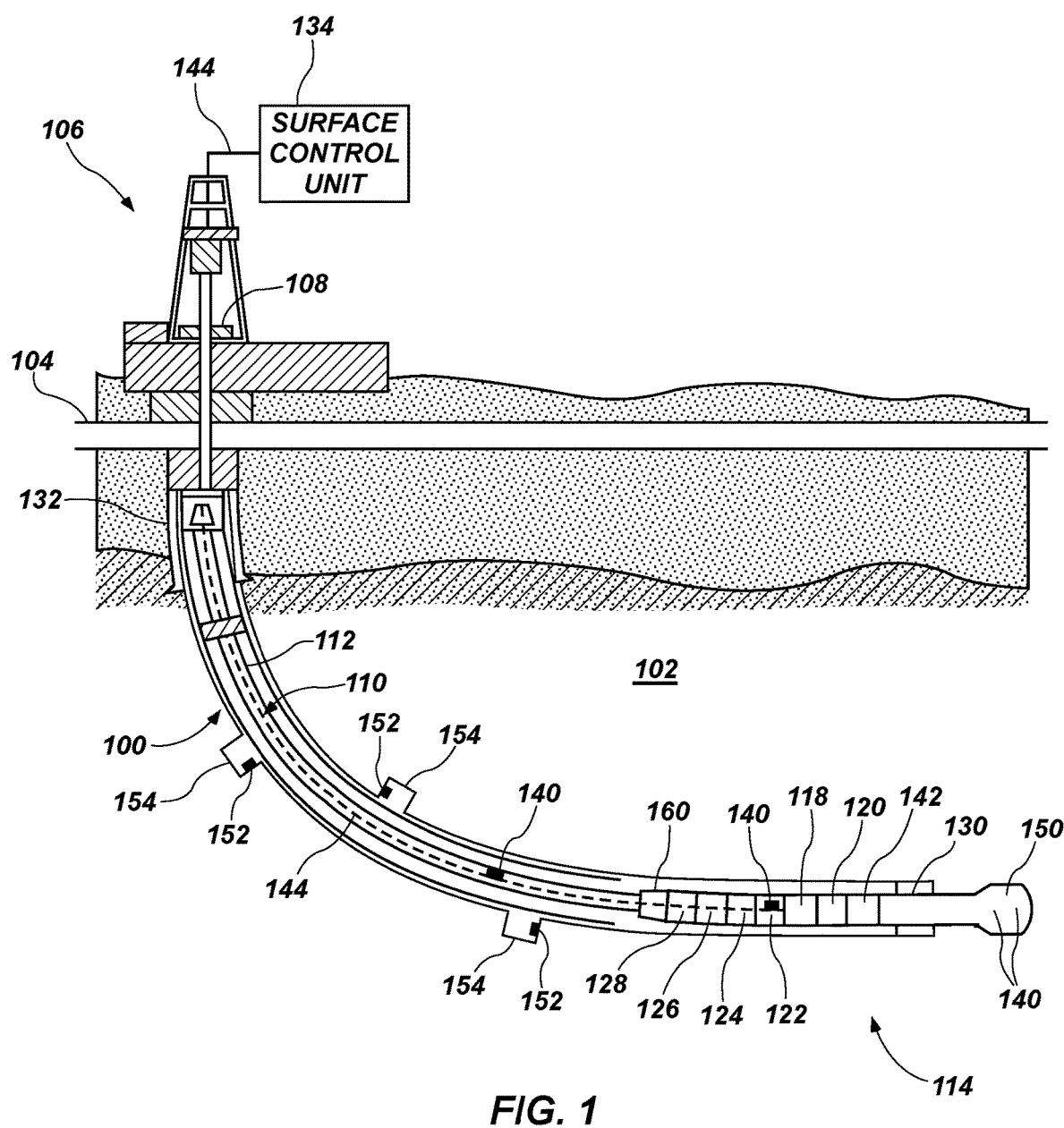
FIG. 1 is a simplified, schematic illustration of a downhole drilling system including a downhole system for determining a rate of penetration of a drill string, in accordance with an embodiment of the disclosure.

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for drilling or operating a wellbore in a subterranean formation. Only those process acts and structures necessary to understand the embodiments of the disclosure are described in detail below.

As used herein, the term "identification tag" means and includes an apparatus including an integrated circuit configured to at least one of send and receive an electromagnetic signal and, optionally, an antenna disposed within a carrier. The term is used herein for convenience to refer to any such apparatus and is not limited to a specific structure or configuration.

During drilling of a wellbore, the rate of penetration (ROP) of the drilling operation is a parameter of significant interest. The rate of penetration of a downhole tool or downhole component (e.g., a drill string) may be determined according to one or more embodiments described herein. In one embodiment, an identification system, such as a radio-frequency identification (RFID) system, comprises a frequency identification reader (e.g., a scanner) secured to at least a portion of the downhole tool (e.g., the drill string, such as a bottomhole assembly) and a plurality of frequency identification tags placed at one or more locations within the wellbore. The plurality of identification tags may be secured to a sidewall of the wellbore, each of which may be located a known distance from other identification tags of the plurality of identification tags. The readers and the identification tags may be configured to communicate with each other when they are located proximate each other. Accordingly, when a portion of the drill string including a reader secured thereto becomes proximate an identification tag (i.e., when the reader passes by an identification tag), the reader may be configured to detect a position of the identification tag. The reader may be operably coupled to a processor, which may have associated therewith memory configured to store a time when the reader is first detected at least a predetermined distance from the identification tag. As the drill string advances further through the wellbore, the reader may detect proximity of at least another identification tag located a known distance from the previously located identification tag. The processor may be programmed to determine a rate of penetration of the drill string based on a duration between when the proximity of first identification tag and the proximity of the second identification tag are determined, and a known distance between the first identification tag and the second identification tag.

In other embodiments, a rate of penetration of the drill string may be determined based on a difference between a dynamic pressure in the drill string and a dynamic pressure in an annular space between an outer wall of the drill string and a wall of the wellbore. A static-pitot tube may be coupled to an inner wall of the drill string and another static-pitot tube may be coupled to an outer wall of the drill string. The static-pitot tubes may be used to measure the dynamic pressures of the fluids in which they are disposed. A processor may be programmed to determine the rate of penetration of the drill string based at least in part on a comparison between the dynamic pressure of the fluid in the drill string and a dynamic pressure of the fluid in the annular space.

FIG. 1 is a simplified, schematic representation showing a nonlimiting example of a wellbore 100 being formed (i.e., drilled or reamed) in a subterranean formation 102. One or more sections of the wellbore 100 may include one or more sections of casing 132 disposed therein. The wellbore 100 may be a partially formed wellbore 100 that is currently undergoing further drilling to extend a depth of the wellbore 100, as well as enlargement of a diameter of the wellbore 100, as illustrated in FIG. 1. Thus, a drilling system 106 used to form the wellbore 100 may include components at a surface 104 of the subterranean formation 102, as well as components that extend into, or are disposed within the wellbore 100. The drilling system 106 includes a rig 108 at the surface 104 of the subterranean formation 102, and a drill string 110 extending into the subterranean formation 102 from the rig 108. The drill string 110 includes a tubular member 112 that carries a bottomhole assembly (BHA) 114 at a distal end thereof. The tubular member 112 may be made up by joining drill pipe sections in an end-to-end configuration.

The bottomhole assembly 114 may include, as nonlimiting examples, one or more of a drill bit 150, a steering device 118, a drilling motor 120, a sensor sub 122, a formation evaluation (FE) module 124, a stabilizer 126, a bidirectional communication and power module (BCPM) 128, a hole enlargement device 130 (i.e., reamer), and a sidewall coring tool 160. The drill bit 150 may be configured to crush, shear, abrade, or otherwise remove portions of the subterranean formation 102 during formation of the wellbore 100. The drill bit 150 may include a fixed-cutter earth-boring rotary drill bit (also referred to as a "drag" bit), a rolling-cutter earth-boring rotary drill bit including cones that are mounted on bearing pins extending from legs of a bit body such that each cone is capable of rotating about the bearing pin on which the cone is mounted, a diamond-impregnated bit, a hybrid bit (which may include, for example, both fixed cutters and rolling cutters), or any other earth-boring tool suitable for forming the wellbore 100.

The drill string 110 and bottomhole assembly 114 may be rotated within the wellbore 100 using the drilling motor 120, from the surface 104 above the bottomhole assembly 114, or both. The drilling motor 120 may comprise, for example, a hydraulic Moineau-type motor having a shaft, to which other components of the bottomhole assembly 114 are coupled, that may be caused to rotate the drill bit 150 by pumping fluid (e.g., drilling fluid, commonly characterized as drilling "mud") from the surface 104 of the formation 102 down through the center of the drill string 110, through the drilling motor 120, out through nozzles in the drill bit 150, and back up to the surface 104 of the formation 102 through an annular space between an outer surface of the drill string 110 and an exposed surface of the subterranean formation 102 within the wellbore 100 (or an exposed inner surface of any casing 132 within the wellbore 100). The bottomhole assembly 114 may be rotated within the wellbore 100 by rotating the drill string 110 from the surface 104 of the subterranean formation 102 with a rotary table or top drive.

If employed, the sidewall coring tool 160 may be configured to remove a sidewall core from a surface of the subterranean formation 102 perpendicular to the wellbore 100, forming pockets 154 in subterranean formation 102. The pockets 154 may be formed at known distances relative to each other (e.g., every 500 feet, every 1,000 feet, etc.) or at known depths or locations relative to the surface 104. The sidewall coring tool 160 may comprise, for example, a percussion coring tool (e.g., referred to in the art as a "core gun") or a rotary coring tool. The sidewall coring tool 160 or another tool of the drill string 110 may be configured to secure one or more unique identification tags 152 within one or more of the pockets 154.

If identification tags 152 are to be employed, one or more components secured to the drill string 110 may include one or more readers (also called "interrogators") 140 that may be used to determine a rate of penetration of the drill string 110 during formation of the wellbore 100, after the formation of the wellbore 100, or both. One or more readers 140 may be coupled to or disposed within the drill bit 150, the hole enlargement device 130, or one or more other sections of the bottomhole assembly 114, such as on a drill collar, the stabilizer 126, a reamer (e.g., the hole enlargement device 130), a bit sub, the steering device 118, or other tool or component of the bottomhole assembly 114. The reader 140 may be configured to detect proximity of an identification tag 152 when the reader 140 is located within a predetermined distance of the respective identification tag 152. A system comprising one or more readers 140 and one or more of the identification tags 152 may comprise an identification system, such as an Automatic Identification and Capture (AIDC) system (e.g., a real-time locating system (RLTS)). By way of nonlimiting example, the system may comprise a radio-frequency identification (RFID) system. In some such embodiments, the readers 140 and the identification tags 152 comprise radio-frequency identification (RFID) readers and RFID tags, respectively.

In some embodiments, the readers 140 may be operably coupled to the drill bit 150 or to one or more other components of the drill string 110 as an array of readers 140. The readers 140 may be axially spaced predetermined distances from one another along a longitudinal axis of the drill string 110, on one or more components of the drill string 110 or the bottomhole assembly 114, or on the drill bit 150. In some embodiments, one or more readers 140 may be attached to different components of the bottomhole assembly 114. In other embodiments, an array of readers 140 is coupled to the drill bit 150 and another array of readers 140 is coupled to one or more other components of the drill string 110 or of bottomhole assembly 114.

The readers 140 may be configured to operatively communicate with one or more of the identification tags 152 and estimate a location of the identification tag 152 relative to the reader 140. The reader 140 and identification tags 152 may be configured to communicate (e.g., transmit one or more electronic or electromagnetic signals therebetween) when the reader 140 and the identification tag 152 are located proximate one another, such as when the drill string 110 including a reader 140 passes adjacent to or proximate a pocket 154 including an identification tag 152.

The readers 140 may include any apparatus configured to electromagnetically or electrostatically couple with the identification tags 152. The readers 140 may comprise a transceiver (e.g., a transmitter and a receiver) configured to transmit electromagnetic radiation therefrom and receive and detect electromagnetic radiation from the identification tags 152. The reader 140 may include an antenna configured to transmit electromagnetic radiation (e.g., radio waves) to activate a transponder of the identification tags 152. The electromagnetic radiation transmitted from the reader 140 may be referred to herein and in the art as an "interrogation signal." The reader 140 may be configured to substantially continuously transmit the interrogation signal therefrom. Each identification tag 152 may comprise a transponder configured to receive the interrogation signal from the reader 140 and transmit a response signal comprising electromagnetic radiation back to the reader 140 responsive to receiving electromagnetic radiation therefrom. The reader 140 may be configured to receive the response signal from the identification tags 152, identify the identification tag 152 from which a received response signal originated, and identify a location of the identification tag 152. The reader 140 may be configured to convert the electromagnetic radiation of the response signal to a usable form of data and transmit such data to a processor, as will be described herein.

The readers 140 may be configured to communicate with each of the identification tags 152 that are within a field of operation of the reader 140 (e.g., located within a predetermined distance of the reader 140). The readers 140 may be configured to detect a proximity of an identification tag 152 when the identification tag 152 is located within the range of operation of the reader 140. A range of the readers 140 may be selected to be between about, for example, one foot and about ten feet, such as between about one foot and about five feet, or between about five feet and about ten feet.

At least some of the readers 140 may be configured to transmit electromagnetic radiation of a predetermined pulse rate, frequency, amplitude, energy, and combinations thereof to the wellbore 100 (e.g., toward one or more of the identification tags 152) for interrogation of identification tags 152 and at least some of the readers 140 may be configured to detect electromagnetic radiation received from one or more of the identification tags 152 responding to the interrogation.

Each identification tag 152 may comprise an integrated circuit containing electronically stored information therein. The electronically stored information may be unique to the identification tag 152 containing the integrated circuit. For example, each of the identification tags 152 may include a memory configured to store information related to that particular identification tag 152, including, for example, a unique identification number (e.g., a serial number, also referred to in the art as a tag identifier (TID)) so that an identity and location of the identification tag 152 can be determined and tracked by one or more readers 140. Each identification tag 152 may include an antenna configured to receive electromagnetic radiation transmitted from the readers 140 (i.e., the interrogation signal) and transmit the electromagnetic radiation to the integrated circuit thereof.

Responsive to receiving an interrogation signal from a reader 140, the identification tag 152 may transmit electromagnetic radiation (i.e., the response signal) including the unique identification number identifying the identification tag 152 or other specific information from which the response signal originated, indicative of a location of the identification tag 152 within the wellbore 100. In some embodiments, the identification tags 152 may be configured to transmit a response signal only when the reader 140 is located proximate the identification tag 152 (i.e., only when the identification tag 152 is located within a range of the reader 140). In other embodiments, the identification tags 152 may comprise active transponders, meaning that the identification tags 152 are configured to periodically transmit an identification signal comprising the unique identification number at predetermined time intervals, which may be received by readers 140 located proximate the identification tag 152. In some embodiments, in lieu of or in addition to transmitting a signal comprising a unique identification number, each of the identification tags 152 may be configured to transmit a response signal comprising electromagnetic radiation exhibiting a different frequency, amplitude, wavelength, pulse time, energy, etc., than the other identification tags 152.

The identification tags 152 may be configured to modulate (and demodulate) an interrogation signal received from a reader 140 or may backscatter the interrogation signal received from the reader 140, as known in the art of radio-frequency identification. Stated another way, the unique response signal of each of the identification tags 152 may comprise a modulated signal.

In use and operation, each identification tag 152 may receive an interrogation signal from the reader 140 when the reader 140 is located proximate identification tag 152. Since each identification tag 152 includes a unique identification number, the readers 140 may be configured to distinguish between several identification tags 152 that may be disposed different locations along a length of the wellbore 100.

In some embodiments, at least a first identification tag 152 is disposed at a first location in the wellbore 100 (e.g., in a first pocket 154) located a known distance from a second location in the wellbore 100 (e.g., in a second pocket 154) in which a second identification tag 152 is disposed. The reader 140 may transmit an interrogation signal substantially continuously during advancement of the drill string 110. When the reader 140 is located proximate the first identification tag 152 (i.e., when a portion of the drill string 110 to which the reader 140 is coupled passes by pocket 154 including the first identification tag 152), the first identification tag 152 may receive the interrogation signal. Responsive to receiving the interrogation signal, the first identification tag 152 may transmit a response signal, which may be received by the reader 140. The response signal may uniquely identify the first identification tag 152. Responsive to receiving the response signal from the first identification tag 152, the reader 140 may transmit the unique identifying information to a processor, which may retain a time when the reader 140 received the response signal from the first identification tag 152. As the reader 140 advances through the wellbore 100, the reader 140 may pass the second identification tag 152 and receive a response signal therefrom. Responsive to receiving the response signal from the second identification tag 152, the reader 140 may transmit the information to the processor, which may retain a time when the reader 140 received the signal.

The processor have an associated memory configured to store a location of each identification tag 152 within the wellbore 100 and a distance between each identification tag 152 from other identification tags 152 within the wellbore 100. By way of nonlimiting example, the memory may store information such as a depth of each identification tag 152 from the surface 104, a distance between each identification tag 152 and adjacent identification tags 152, and unique identifying information about each of the identification tags 152. The processor may include a clock, by which a time when the reader 140 receives a response signal from each of the identification tags 152 may be identified. The processor may be programmed to determine a rate of penetration of the drill string 110 based, at least in part, on when a reader 140 receives a response signal from the first identification tag 152 and the second identification tag 152 and a distance between the first identification tag 152 and the second identification tag 152. Stated another way, the processor may be programmed to determine a rate of penetration of the drill string 110 based on a duration between when the reader 140 approaches within a predetermined distance of each of two or more identification tags 152 located a known distance from each other.

In yet other embodiments, the processor may be programmed to store, in the memory, a distance by which one or more readers 140 are separated on the drill string 110. The processor may calculate the rate of penetration of the drill string 110 based on a duration between receiving, at a first reader 140, a response signal from a first identification tag 152 and receiving, at a second reader 140, a response signal from the first identification tag 152 and a distance between the first reader 140 and the second reader 140. The rate of penetration may be substantially equal to the distance between the first reader 140 and the second reader 140 divided by the duration.

In some embodiments, a first identification tag 152 and a second identification tag 152 may be used to monitor or estimate an amount of hydrocarbon depletion of a producing reservoir. In some such embodiments, a first identification tag 152 may be placed at a first location, such as at a first depth of a reservoir formation and a second identification tag 152 may be placed at a second location, such as at a second, lower depth of the reservoir formation. A distance between the first identification tag 152 and the second identification tag 152 prior to production from the reservoir may be known. A distance between the first identification tag 152 and the second identification tag 152 after a period of production may be indicative of reduction in depth of the formation and, thus an indication of a volume of hydrocarbons that have been recovered from the reservoir formation. By way of nonlimiting example, a shorter distance between the identification tags 152 may be an indication of an amount of hydrocarbon depletion of the reservoir formation.

In other embodiments, one or more identification tags 152 may be used to identify a specific location within a wellbore. By way of nonlimiting example, an identification tag 152 may be located at a depth or location at which it is desired to orient the wellbore 100 from a vertical orientation to a deviated or even lateral orientation or at a location where sidetracking may be desired (e.g., a location where it is desired to deviate from the existing wellbore 100 to follow one or more directions in which the subterranean formation 102 extends). Responsive to receiving a response signal from the identification tag 152 by one or more readers 140, the drill string 110 may be steered in a desired deviated angle and/or direction (e.g., north, south, east, west, etc.).

In some embodiments, it is contemplated that the reader 140 and the identification tags 152 may be used to determine an azimuth and an inclination (i.e., a deviation of the wellbore 100) from vertical. By way of nonlimiting example, a surveying tool may be used to determine an azimuth and an inclination of the drill string 110 at locations of each of the pockets 154. A processor may be programmed to process the azimuth and the inclination of the drill string 110 at a location proximate each of the identification tags 152, which data may be retained in memory and, if desired and the bottomhole assembly 114 is appropriately equipped, transmitted to the surface 104.

The readers 140 may be in communication with one or more controllers, such as one or more of a surface controller 134 or a downhole controller 142. The surface controller 134 may be used for receiving and processing information from the downhole controller 142. The surface controller 134 may include a processor, a storage device (e.g., a memory) for storing data, and computer programs. The processor accesses the data and programs from the storage device and executes the instructions contained in the programs, by which the drilling system 106 may be controlled during drilling operations, either by an operator or automatically, in the case of a closed-loop drilling system. In some embodiments, the surface controller 134 may be operably coupled to an electronic display for displaying one or more conditions within the wellbore 100.

The downhole controller 142 may be in electrical communication with the readers 140. The downhole controller 142 may be placed within the bottomhole assembly 114 for receiving and processing downhole data. The downhole controller 142 may include a processor (e.g., a microprocessor), a storage device (e.g., a memory) for storing data, and computer programs. The processor accesses the data and programs from the storage device and executes the instructions contained in the programs to store information related to a relative position of each reader 140 to identification tags 152 and to calculate a rate of penetration of the drill string 110, as described herein.

The downhole controller 142 may be configured to communicate data with the surface controller 134 and thus, may be in communication with the surface controller 134. In some embodiments, the readers 140, the downhole controller 142, and the surface controller 134 communicate with each other via a communication interface 144. The communication interface 144 may include a wire configured to transmit the data to and from the surface 104, wireless communications, electrical cables, fiber optic cables, mud pulse telemetry, or other interface suitable for transferring data and signals to and from each of the readers 140, the downhole controller 142, and the surface controller 134. If carried by drill bit 150, the readers 140 may be in communication with downhole controller 142 located above the drill bit 150 in the bottomhole assembly 114 by, for example, a so-called "short hop" wireless interface.

The communication interface 144 may extend along an interior of the drill string 110 (such as an interior of the tubular member 112), similar to a wireline, as is known to those of ordinary skill in the art, and may run into the drill string 110 as desired, or may be permanently deployed within the drill string 110, such as within the walls of the components of the drill string 110 and bottomhole assembly 114. Although the communication interface 144 is illustrated as extending along an interior of the drill string 110, the communication interface 144 may be located at any suitable location within the bottomhole assembly 114 relative to the drill string 110. For example, the communication interface 144 may run along an exterior of the drill string 110, or comprise part of a self-contained sensor package in a sub configured for wireless communication.

Although the processor for determining the rate of penetration has been described herein with respect to the downhole controller 142, it is contemplated that the surface controller 134 may include memory and a processor for determining the rate of penetration from raw data transmitted uphole from the readers 140. In some such embodiments, the drilling system 106 may not include the downhole controller 142 and may include, for example, only the surface controller 142 and a suitable communication interface 144.

Figure 2:
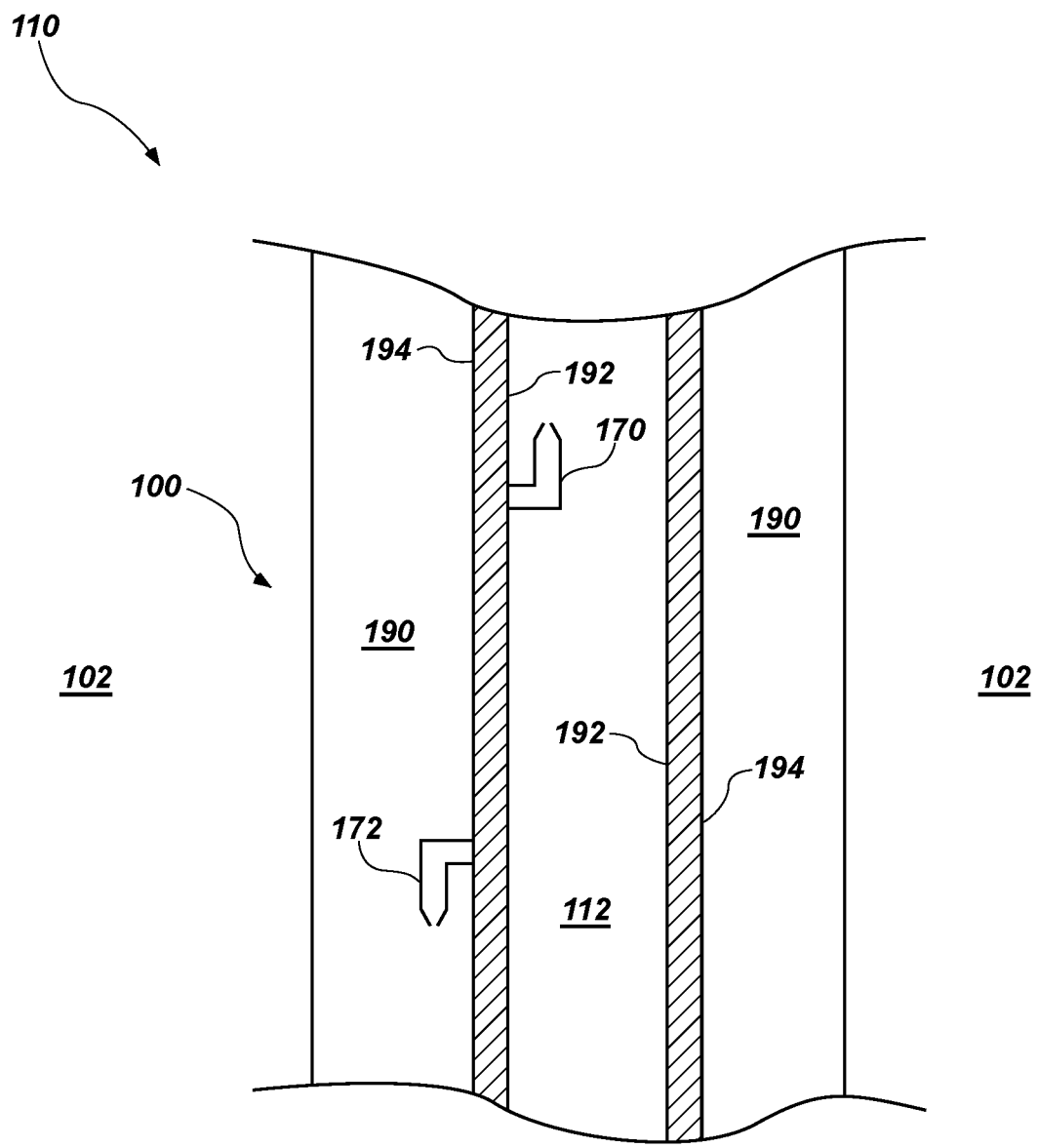
FIG. 2 is a longitudinal cross-sectional view of a drill string, in accordance with an embodiment of the disclosure.

In other embodiments, the rate of penetration of the drill string 110 may be determined based, at least in part, on a differential between a dynamic pressure within the drill string 110 and a dynamic pressure within an annular space between the drill string 110 and a wall of the wellbore 100, in combination with other, known parameters. FIG. 2 is a schematic longitudinal cross-sectional view of a portion of the drill string 110 including one or more components for determining a rate of penetration of the drill string 110 according to another embodiment of the disclosure. At least a first pitot-static tube (also referred to in the art as a Prandtl tube) 170 configured to measure a stagnation pressure and a static pressure of a fluid flowing downwardly through the drill string 110 may be coupled to an inner wall 192 of the tubular member 112 of the drill string 110. The first pitot-static tube 170 may be oriented such that fluid flowing in the tubular member 112 enters the first pitot-static tube 170.

At least a second pitot-static tube 172 may be coupled to an outer wall 194 of the drill string 110 and may be configured to measure a stagnation pressure and a static pressure of the fluid flowing through an annular space 190 between the wellbore 100 wall and the outer wall 194 of the drill string 110, such volume being commonly referred to as the "wellbore annulus." The pitot-static tube 172 may be oriented such that fluid flowing upwardly in the annular space 190 enters the pitot-static tube 172.

Figure 3:
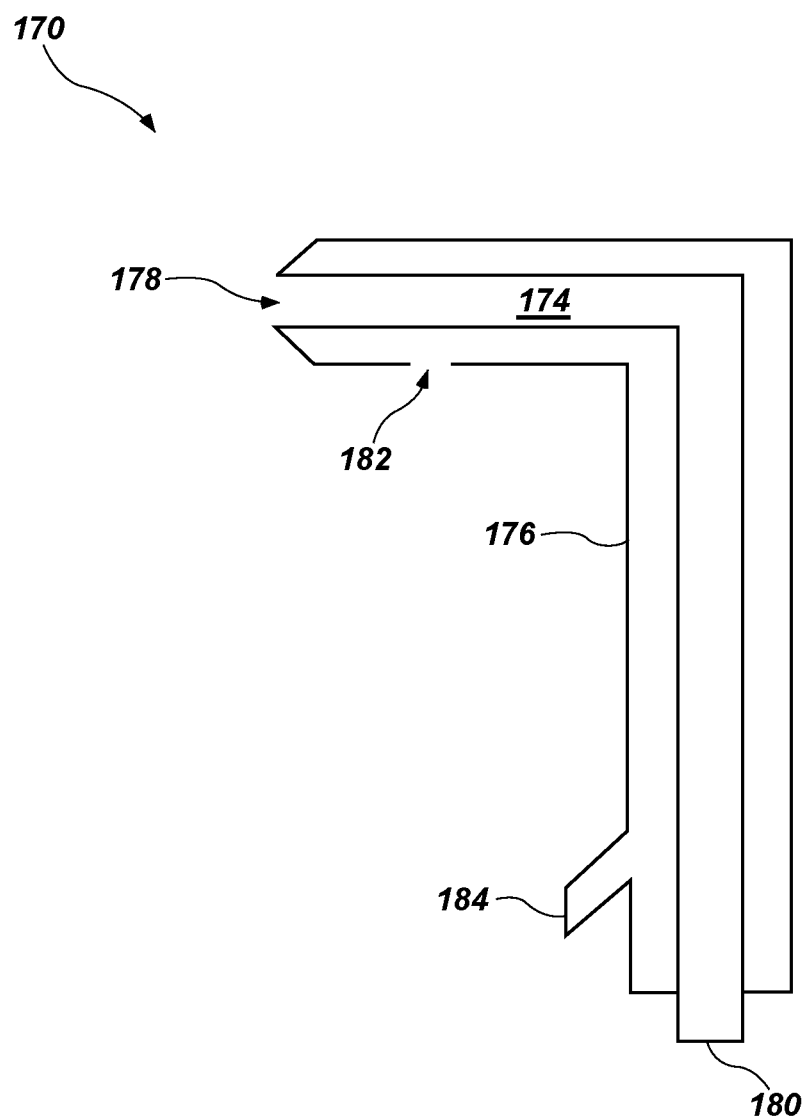
FIG. 3 is a simplified cross-sectional view of a pitot-static tube.

FIG. 3 is a simplified cross-sectional view of a pitot-static tube 170. The pitot-static tube 170 includes a pitot tube 174 located at central portion thereof and a static tube 176 surrounding the pitot tube 174. The pitot tube 174 may be configured to measure a stagnation pressure and the static tube 176 may be configured to measure a static pressure of a fluid in which the pitot-static tube 170 is disposed. In use and operation, an inlet 178 to the pitot tube 174 may face a direction of fluid flow. An end 180 of the pitot tube 174 may be coupled to a pressure sensor configured to measure a pressure within the pitot tube 174, which may substantially correspond to a stagnation pressure of the fluid.

One or more static ports 182 may be disposed around an outer portion of the static tube 176. Although only one static port 182 is illustrated in FIG. 3, the static tube 176 may include a plurality of static ports, as known by those of ordinary skill in the art. The static ports 182 may be oriented substantially perpendicular to a direction of fluid flow proximate the pitot-static tube 170. An end 184 of the static tube 176 may be coupled to a pressure sensor configured to measure a static pressure of the fluid. A processor of one or both of the downhole controller 142 or the surface controller 134 may be operably coupled to the pitot-static tube 170 and may be configured to store information related to the stagnation pressure and the static pressure measured therein.

A dynamic pressure of the fluid may be equal to a differential pressure between the stagnation pressure and the static pressure. Accordingly, in some embodiments, the processor is configured to determine the dynamic pressure of the fluid by subtracting the static pressure from the stagnation pressure. In other embodiments, a diaphragm may be placed between the pitot tube 174 and the static tube 176 and the dynamic pressure may be measured directly as the differential pressure across the diaphragm, as known in the art.

Thus, with reference again to FIG. 2, a dynamic pressure of fluid within the tubular member 112 may be determined with the first pitot-static tube 170 and a dynamic pressure of fluid in the annular space 190 may be determined with the second pitot-static tube 172.

The rate of penetration of the drill string 110 may be determined based on the dynamic pressures obtained from the pitot-static tubes 170, 172. For example, a velocity of a fluid may be related to the dynamic pressure of the fluid according to Equation (1) below:

$$v_p = (2P_d/\rho)^{1/2} \qquad (1),$$

wherein $P_d$ is the dynamic pressure of the fluid, $\rho$ is the density of the fluid, and $v_p$ is the velocity of the fluid relative to the static-pitot tube measuring the stagnation pressure and the static pressure (i.e., relative to the tubular member 112). Accordingly, a velocity of the fluid proximate the first pitot-static tube 170 and a velocity of the fluid proximate the second pitot-static tube 172 may be calculated based on the dynamic pressure.

A velocity of the fluid in the tubular member 112 relative to the wellbore 100 may be equal to the velocity of the fluid in the tubular member 112 relative to the tubular member 112 plus the rate of penetration of the tubular member 112 in the wellbore 100, as shown in Equation (2) below. Similarly, a velocity of the fluid in the annular space 190 relative to the wellbore 100 may be equal to the velocity of the fluid in the annular space 190 relative to the tubular member 112 minus the rate of penetration of the tubular member 112 in the wellbore 100, as shown in Equation (3), below:

$$v_1 = v_{p1} + \text{ROP} \qquad (2),$$

$$v_2 = v_{p2} - \text{ROP} \qquad (3),$$

wherein $v_1$ is the velocity of the fluid in the tubular member 112 relative to the wellbore 100, $v_{p1}$ is the velocity of the fluid in the tubular member 112 relative to the tubular member 112, $v_2$ is the velocity of the fluid in the annular space 190 relative to the tubular member 112, $v_{p2}$ is the velocity of the fluid in the annular space 190 relative to the wellbore 100, and ROP is the rate of penetration of the drill string 110.

A volume of fluid (e.g., drilling mud) flowing through the tubular member 112 may be substantially equal to a volume of fluid flowing through the annular space 190, according to Equation (4) below:

$$v_1 A_1 = v_2 A_2 \qquad (4),$$

wherein $v_1$ and $v_2$ are the same as before, $A_1$ is the cross-sectional area of the tubular member 112, and $A_2$ is the cross-sectional area of the annular space 190.

Accordingly, it follows that:

$$(v_{p1} + \text{ROP}) A_1 = (v_{p2} - \text{ROP}) A_2 \qquad (5),$$

wherein $v_{p1}$, $A_1$, $v_{p2}$, $A_2$, and ROP are the same as before. In some embodiments, a processor may be programmed to determine a rate of penetration of the drill string 110 based on Equation (5).

The processor of at least one of the surface controller 134 and the downhole controller 142 may have an associated memory configured to store information related to, for example, a stagnation pressure and a static pressure of the fluid within the tubular member 112, a stagnation pressure and a static pressure of the fluid in the annular space 190, a cross-sectional area of the tubular member 112 (i.e., $A_1$), a cross-sectional area of the annular space 190 (i.e., $A_2$), and a density of the fluid in the tubular member 112 and the annular space 190 (i.e., $\rho$).

The processor may be programmed to determine, based on the data stored in memory and instructions contained in programs therein, a velocity of fluid in the tubular member 112 relative to the tubular member 112 (i.e., $v_{p1}$) and a velocity of the fluid in the annular space 190 relative to the tubular member 112 (i.e., $v_{p2}$). The processor may further be configured to calculate the rate of penetration based, at least in part, on one or more of the stagnation pressure and the static pressure in the tubular member 112 and the annular space 190, a cross-sectional area of the tubular member 112, a cross-sectional area of the annular space 190, and the density of the fluid.

Of course, in some embodiments, it is contemplated that if the velocity of the fluid relative to the wellbore 100 is known, such as with a flowmeter, a rate of penetration of the drill string 110 may be calculated according to Equation (2) or Equation (3) above. In some such embodiments, the processor may be programmed to determine the rate of penetration based on one or more of the velocity of the fluid in the tubular member 112 relative to the wellbore 100, the velocity of the fluid in the annular space 190 relative to the wellbore 100, the velocity of the fluid in the tubular member 112 relative to the tubular member 112, or the velocity of the fluid in the annular space 190 relative to the tubular member 112.

Calculating a rate of penetration according to the methods described herein with reference to FIGS. 1 through 3 may substantially reduce an error that may be caused by drill string flexing, elongation, and contraction as the drill bit 150 proceeds through one or more subterranean formations having different rock characteristics. In some embodiments, the rate of penetration may be calculated directly based on a distance between identification tags 152 (FIG. 1) placed at known relative locations within the subterranean formation 102 and at least one reader 140 (FIG. 1) placed on the drill string 110. In other embodiments, the rate of penetration may be calculated based on differences between dynamic pressures in the drill string 110 and in the annular space 190 (FIG. 2) in combination with other known parameters.

Additional nonlimiting example embodiments of the disclosure are set forth below.

Embodiment 1

A method of determining rate of penetration of a downhole tool, the method comprising: introducing a downhole tool in a wellbore, the downhole tool comprising at least one reader configured to communicate with identification tags using electromagnetic radiation; advancing the downhole tool in the wellbore; placing, with a component of a bottomhole assembly of the downhole tool, a first identification tag at a first location proximate the wellbore and at least a second identification tag at a second location proximate the wellbore separated from the first location by a distance; transmitting an interrogation signal comprising electromagnetic radiation from the at least one reader toward a wall of the wellbore and receiving, with the at least one reader, a response signal from each of the first identification tag and the at least a second identification tag when the at least one reader is located proximate each respective first identification tag and the at least a second identification tag; and determining, using a processor and associated memory, a rate of penetration of the downhole tool with the processor based at least in part on the distance and an amount of time between receiving a response signal from the first identification tag and receiving a response signal from the at least a second identification tag.

Embodiment 2

The method of Embodiment 1, further comprising selecting the first identification tag and the at least a second identification tag to each comprise a radio-frequency identification tag.

Embodiment 3

The method of Embodiment 1 or Embodiment 2, further comprising selecting the response signal from the first identification tag and the response signal from the at least a second identification tag to comprise unique identification information associated with the respective identification tag from which the response signal originates.

Embodiment 4

The method of any one of Embodiments 1 through 3, further comprising transmitting electromagnetic radiation comprising unique identification information associated with the first identification tag and the at least a second identification tag therefrom at predetermined time intervals.

Embodiment 5

The method of any one of Embodiments 1 through 4, further comprising forming a first pocket and at least a second pocket for placement of the first identification tag and the at least a second identification tag with a sidewall coring tool.

Embodiment 6

The method of any one of Embodiments 1 through 5, wherein the at least one reader comprises at least one reader and at least another reader mutually separated from one another by a known distance.

Embodiment 7

The method of Embodiment 6, further comprising receiving a response signal from the first identification tag with each of the at least one reader and the at least another reader.

Embodiment 8

The method of any one of Embodiments 1 through 6, further comprising forming a first pocket for placement of the first identification tag at a first location of a hydrocarbon-containing reservoir formation intersected by the wellbore and forming at least a second pocket for placement of the at least a second identification tag at a second location of the hydrocarbon-containing reservoir formation intersected by the wellbore.

Embodiment 9

The method of Embodiment 8, further comprising determining a difference between a distance between the first identification tag and the at least a second identification tag at separate time intervals during which hydrocarbons are being extracted from the hydrocarbon-containing reservoir formation.

Embodiment 10

The method of any one of Embodiments 1 through 9, further comprising forming at least one pocket for placement of an identification tag proximate a location where the wellbore is to transition from a substantially vertical orientation.

Embodiment 11

A downhole system for determining a rate of penetration of a drill string, the downhole system comprising: a drill string including a drill bit configured to drill through a subterranean formation; a first identification tag and at least a second identification tag disposed within a component of a bottomhole assembly of the drill string; at least one reader coupled to a member of the drill string and configured to identify a location of the first identification tag and the second identification tag relative to the at least one reader; and a controller comprising a memory and a processor coupled to the at least one reader, the processor configured to: determine a duration between when the at least one reader receives, from each of the first identification tag and the at least a second identification tag, a unique signal comprising identification information associated with each of the respective first identification tag and the at least a second identification tag when the at least one reader is located proximate each of the respective first identification tag and the at least a second identification tag; and determine a rate of penetration of the drill string based on the duration and a distance between the first identification tag and the at least a second identification tag.

Embodiment 12

The downhole system of Embodiment 11, further comprising coupling at least another reader to the drill string located a known distance from the at least one reader.

Embodiment 13

The downhole system of Embodiment 11 or Embodiment 12, wherein the processor comprises a clock configured to identify a time when the at least one reader receives the unique signal from the first identification tag and from the second identification tag.

Embodiment 14

The method of any one of Embodiments 11 through 13, wherein the first identification tag is configured to be disposed at a different azimuth than the second identification tag.

Embodiment 15

A method of determining a rate of penetration of a drill bit, the method comprising: introducing a drill string including a drill bit configured to drill through a subterranean formation in a wellbore, the drill string comprising a static-pitot tube coupled to an inner wall thereof and another static-pitot tube coupled to an outer wall thereof; advancing the drill string in a wellbore with the drill bit; determining a dynamic pressure of fluid within the drill string and a dynamic pressure of fluid within an annular space between the outer wall of the drill string and a wall of the wellbore; and determining, using a processor and associated memory, a rate of penetration of the drill string with the processor based at least in part on the dynamic pressure of the fluid within the drill string and the dynamic pressure of the fluid within the annular space.

Embodiment 16

The method of Embodiment 15, wherein determining a dynamic pressure of fluid within the drill string comprises measuring a differential pressure between a stagnation pressure and a static pressure measured by the static-pitot tube coupled to the inner wall of the drill string.

Embodiment 17

The method of Embodiment 15 or Embodiment 16, further comprising determining, with the processor, a velocity of the fluid in the drill string relative to the drill string and a velocity of the fluid in the annular space relative to the drill string.

Embodiment 18

The method of Embodiment 17, wherein determining, with the processor, a velocity of the fluid in the drill string relative to the drill string comprises determining the velocity based, at least in part, on the dynamic pressure of the fluid within the drill string.

Embodiment 19

The method of any one of Embodiments 15 through 18, wherein determining, using a processor and associated memory a rate of penetration of the drill string with the processor further comprises determining the rate of penetration based on: a velocity of the fluid in the drill string relative to the drill string and a cross-sectional area of the drill string; and a velocity of the fluid in the annular space relative to the drill string and a cross-sectional area of the annular space.

Embodiment 20

The method of any one of Embodiments 15 through 19, wherein determining, using a processor and associated memory, a rate of penetration of the drill string with the processor further comprises determining the rate of penetration based at least in part on a density of the fluid within the drill string and a density of the fluid in the annular space.

Although the foregoing description contains many specifics, these are not to be construed as limiting the scope of the disclosure, but merely as providing certain embodiments. Similarly, other embodiments may be devised that do not depart from the scope of the invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to embodiments of the disclosure, as described and illustrated herein, which fall within the meaning and scope of the claims, are encompassed by the invention.

What is claimed is:

1. A method of determining a rate of penetration of a downhole tool, the method comprising:
    introducing a downhole tool in a wellbore, the downhole tool comprising at least one reader configured to communicate with identification tags using electromagnetic radiation;
    advancing the downhole tool in the wellbore;
    placing, with a component of a bottomhole assembly of the downhole tool, a first identification tag at a first location proximate the wellbore and at least a second identification tag at a second location proximate the wellbore separated from the first location by a distance;
    transmitting an interrogation signal comprising electromagnetic radiation from the at least one reader toward a wall of the wellbore and receiving, with the at least one reader, a response signal from each of the first identification tag and the at least a second identification tag when the at least one reader is located proximate each respective first identification tag and the at least a second identification tag; and
    determining, using a processor and associated memory, a rate of penetration of the downhole tool with the processor based at least in part on the distance and an amount of time between receiving a response signal from the first identification tag and receiving a response signal from the at least a second identification tag.

2. The method of claim 1, further comprising selecting the first identification tag and the at least a second identification tag to each comprise a radio-frequency identification tag.

3. The method of claim 1, further comprising selecting the response signal from the first identification tag and the response signal from the at least a second identification tag to comprise unique identification information associated with the respective identification tag from which the response signal originates.

4. The method of claim 1, further comprising transmitting electromagnetic radiation comprising unique identification information associated with the first identification tag and the at least a second identification tag therefrom at predetermined time intervals.

5. The method of claim 1, further comprising, with a sidewall coring tool, forming a first pocket for placement of the first identification tag and forming at least a second pocket for placement of the at least a second identification tag.

6. The method of claim 1, wherein the at least one reader comprises at least one reader and at least another reader mutually separated from one another by a known distance.

7. The method of claim 6, further comprising receiving a response signal from the first identification tag with each of the at least one reader and the at least another reader.

8. The method of claim 1, further comprising:
selecting the first location and the second location to be within a hydrocarbon-containing reservoir;
forming a first pocket for placement of the first identification tag at the first location; and
forming at least a second pocket at the second location.

9. The method of claim 8, further comprising determining a difference between a distance between the first identification tag and the at least a second identification tag at separate time intervals during which hydrocarbons are being extracted from the hydrocarbon-containing reservoir formation.

10. The method of claim 1, further comprising forming at least one pocket for placement of a third identification tag proximate a location where the wellbore is to transition from a substantially vertical orientation.

11. The method of claim 1, further comprising determining a hydrocarbon depletion of a subterranean formation intersecting the wellbore based on the change in the distance.

12. A downhole system for determining a rate of penetration of a drill string, the downhole system comprising:
a drill string including a drill bit configured to drill through a subterranean formation;
a first identification tag and at least a second identification tag disposed within a component of a bottomhole assembly of the drill string;
at least one reader coupled to a member of the drill string and configured to identify a location of the first identification tag and the second identification tag relative to the at least one reader; and
a controller comprising a memory and a processor coupled to the at least one reader, the processor configured to:
determine a duration between when the at least one reader receives, from each of the first identification tag and the at least a second identification tag, a unique signal comprising identification information associated with each of the respective first identification tag and the at least a second identification tag when the at least one reader is located proximate each of the respective first identification tag and the at least a second identification tag; and
determine a rate of penetration of the drill string based on the duration and a distance between the first identification tag and the at least a second identification tag.

13. The downhole system of claim 12, further comprising at least another reader coupled to the drill string located a known distance from the at least one reader.

14. The downhole system of claim 12, wherein the processor comprises a clock configured to identify a time when the at least one reader receives the unique signal from the first identification tag and from the second identification tag.

15. The downhole system of claim 12, wherein the first identification tag is configured to be disposed at a different azimuth than the second identification tag.

16. The downhole system of claim 12, further comprising a sidewall coring tool configured to dispose the first identification tag and the at least a second identification tag within the subterranean formation.

* * * * *